UNITED STATES PATENT OFFICE.

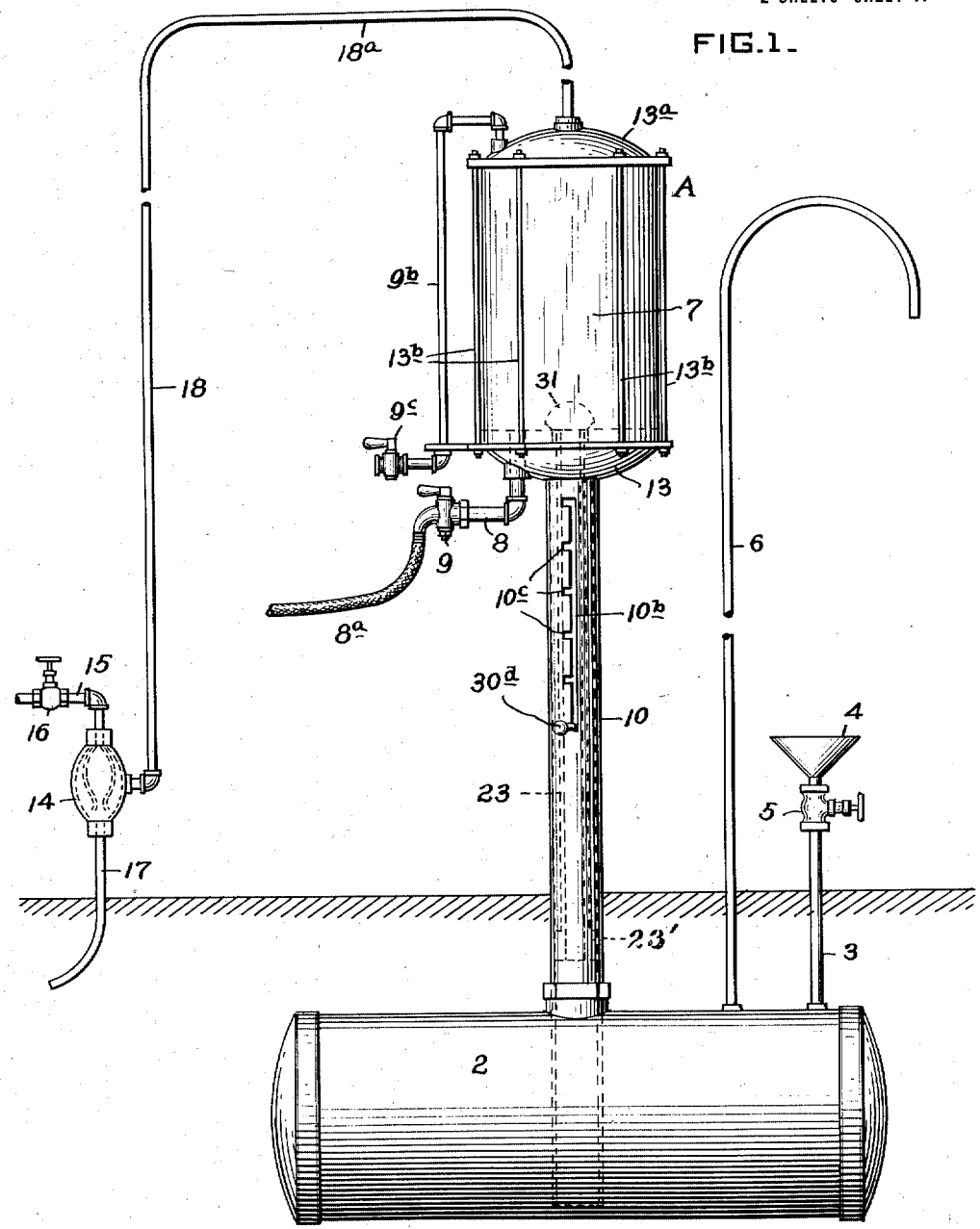

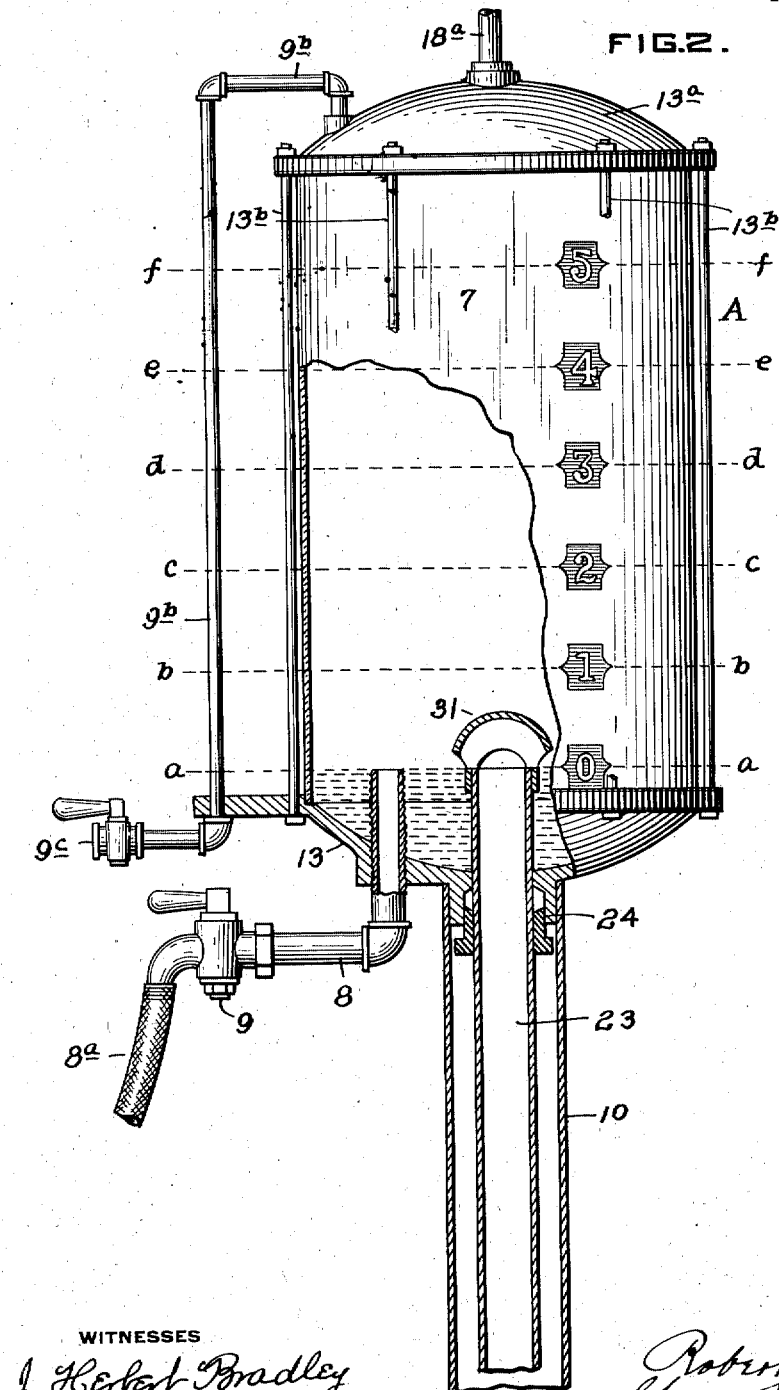

ROBERT T. C. BAIN, OF PITTSBURGH, AND GEORGE W. MacKENZIE, JR., OF ROCHESTER, PENNSYLVANIA, ASSIGNORS TO GUARANTEE LIQUID MEASURE COMPANY, OF ROCHESTER, PENNSYLVANIA, A CORPORATION OF DELAWARE.

LIQUID-MEASURING APPARATUS.

1,255,576.  Specification of Letters Patent.  Patented Feb. 5, 1918.

Application filed October 10, 1916. Serial No. 124,869.

*To all whom it may concern:*

Be it known that we, ROBERT T. C. BAIN and GEORGE W. MACKENZIE, Jr., citizens of the United States, residing at Pittsburgh and Rochester, respectively, in the counties of Allegheny and Beaver, respectively, and State of Pennsylvania, have invented certain new and useful Improvements in Liquid-Measuring Apparatus, of which the following is a specification.

Our invention consists of an improvement in apparatus for delivering gasolene or other liquids in measured quantities from a measuring or secondary tank connected with a main reservoir at any suitable location, adapted to receive fluid from the main reservoir and to measure the amount to be delivered from the secondary tank to a purchaser or user, as indicated by graduated levels.

The invention is of the same general class as that disclosed in the application of MacKenzie *et al.*, Serial No. 33897.

The improvement comprised in the present application is in the means providing a zero level for the gasolene or other liquid which shall be visible and will definitely show at all times the point or level from which the contents of the secondary or measuring tank are graduated upwardly.

A further object and advantage is to provide for a more rapid delivery of the measured quantity of fluid, and also in providing a settling space for water, sediment, or impurities of any kind in the fluid, as gasolene, to settle down into the bottom of the measuring tank, constituting an inactive body portion thereof.

Referring to the drawings illustrating the invention,—

Figure 1 is a general view in elevation, showing the several parts in operative relation.

Fig. 2 is an enlarged sectional detail view, illustrating the improvement.

Referring to Fig. 1, the primary or storage tank or reservoir 2 is provided with any suitable filling pipe 3 having a funnel 4 and a shut-off cock or valve 5. A relief pipe 6 for admitting and discharging atmospheric air is preferably connected with the upper portion of the tank 2, and may extend to any suitable point thereabove.

The secondary or measuring tank A, which may be of any suitable construction, is located at any desired elevation above the primary tank for delivering fluid to a customer or user through a pipe 8, having a controlling valve 9, and a delivery hose extension 8$^a$.

Ordinarily, atmospheric pressure will be restored within tank A upon termination of the air exhausting operation hereinafter described, but for the purpose of positively admitting air, a pipe 9$^b$ is connected with the interior of the tank at the top, so as to admit air therein by a suitable connection to the atmosphere through valve 9$^c$, prior to the time that conduits 8 and 8$^a$ are used for drawing off the contents.

The closing of valve 9$^c$ closes air communication to the interior of the secondary tank, so as to facilitate the exhaustion of air therefrom to effect filling from the main tank 2.

An outer pipe 10 leads from the bottom portion of the measuring tank A to the lower portion of reservoir 2, so as to insure exhausting the contents therefrom, and is in communication with the interior of the measuring tank A through the central vertically adjustable tube 23 adapted to be set at any desired level by the operator.

The secondary or measuring tank A in the present construction consists of a cylindrical shell 7, preferably of glass or other transparent material, clamped between a base 13 and a top 13$^a$ by means of a series of rods 13$^b$ and any suitable intervening packing material, whereby to provide an air-tight chamber. The advantage in having the body portion 7 of glass is to insure visibility of the contents.

For the purpose of creating a partial vacuum in the tank A, any suitable air-exhausting means may be employed, as a siphon or injector 14 of suitable construction connected with any source of fluid under pressure, as by pipe 15 having a controlling valve 16 connected to an ordinary water supply means or system, and having a waste pipe 17 leading to any point of discharge.

A suction pipe 18 is connected with the upper end of tank A, preferably by an upper extension 18ª which may, if desired, extend to a sufficient height to be beyond the range of the ultimate possible rise of the fluid upwardly above tank A.

When air is exhausted from the interior of tank A, liquid will rise from the main reservoir 2 through pipe 10 and telescoping conduit 23 and will fill the tank A more or less, during continuance of the flow. If desired, the tank A may be filled by gravity from any superimposed storage tank, or from any other source of supply connected with pipe 10.

Also, in such case, it not being necessary to depend on the creation of a partial vacuum within tank A, the top may be left open.

The conduit 23 is adapted to be partially rotated by means of an operating trigger or handle 30ᵈ, which extends outwardly through a vertical slot 10ᵇ in conduit 10, having at predetermined positions off-set slots or arresting openings 10ᶜ.

Conduit 23 has a sliding but fluid tight sealing engagement with the conduit 10 by means of a packed head 24, providing for ample vertical movement of the conduit 23, but preventing flow of the liquid from tank A into the conduit 10, otherwise than through the conduit 23, which is preferably provided with a splash coping 31 by which the upwardly rising fluid is directed downwardly into the tank.

The conduit 23 has a piston shaped head 23′ formed on its lower end. The head 23′ is adapted to prevent liquid flowing upwardly beyond said head within the conduit 10.

Locking apertures 10ᶜ are positioned at intervals above the bottom of slot 10ᵇ, corresponding to any desired unit of measurement, as, for instance, one gallon, so that when arm 30ᵈ is thrown around into register with vertical slot 10ᵇ, the conduit 23 may be raised or lowered to any desired position, as, for instance, to the 6th socket, (corresponding to a five-gallon measurement), and the top of the conduit will then be in position to limit the return flow to such level.

Then, by exhausting the air from the interior of tank A by the mechanism above described, fluid will rise through conduit 23, and into the tank to or above the level of the upper end of the conduit. The vacuum creating suction is then terminated, reëstablishing normal atmospheric conditions within the tank, and permitting any surplus to be returned to the main reservoir 2 by overflow back through conduits 23 and 10.

The tank thus being filled to the desired capacity, corresponding to the amount to be drawn off, whereupon, by manipulation of valve lever 9ᶜ, additional air is admitted into the upper portion of tank A, and the contents are drawn off through pipe 8, as will be clearly understood.

Should it be desired, however, to return all or any portion of the contents of the tank to the main reservoir, this may be done by merely lowering conduit 23 to bring its top level with the bottom of the tank, or to any point down to which the contents are to be drawn off and returned to the main tank, before the desired measured amount is delivered to the purchaser.

For the purpose of providing indicating marks for the different levels within tank A, corresponding to the unitary divisions usually utilized in measuring liquids, and corresponding to any definite unit of measurement, as one gallon each, I provide the several levels $a$—$a$, $b$—$b$, $c$—$c$, $d$—$d$, $e$—$e$, and $f$—$f$, and fix upon the face of the glass cylinder 7 corresponding indicating numerals as 0, 1, 2, 3, 4 and 5, as indicated in Fig. 2, and which visibly indicate to the purchaser the exact level to which the liquid rises in the measuring tank as controlled by the position of the terminal of conduit 23, before being withdrawn therefrom.

In order that the purchaser may always see the bottom level from which the liquid is accumulated upwardly within the measuring tank, the withdrawal pipe 8 is projected upwardly within the bottom portion of the tank to a distance corresponding to, and necessarily defining, the zero level $a$—$a$. By so projecting the inlet end of the withdrawal pipe upwardly to such point, it becomes impossible to reduce the level of the contained liquid below such zero point, so that the refilling of the measuring tank will always be in addition to such contents, and above the zero level.

This zero level is purposely placed sufficiently high above the base portion of the measuring tank so as to render it visible at all times, and the contents below such level can only be withdrawn by lowering conduit 23 below the zero level.

The base 13, as shown, is purposely dished downwardly to facilitate the maintenance of a lower, inactive or dormant body of liquid, which thus operates as a collecting and settling reservoir, thus insuring the purity of the superimposed contents.

By fixing the outflow terminal of withdrawal pipe 8 upwardly above the bottom of the tank, and at a level coincident with the zero line $a$—$a$, much time is saved in effecting complete discharge of the measured quantity, as there is no frictional resistance and resulting retardation and delay, as is usual where the last remaining portions of the liquid are withdrawn from the extreme bottom or side of the holding vessel. The outflow is thus continuously regular and rapid to its end and promptly discontinues at the lowermost level, thus saving time to the user and operator.

The advantages of the above described improvement will be understood and appreciated by all those familiar with this type of mechanism. It assures and satisfies the customer as to the correctness of the measured amount, and possesses the several advantages and features above noted, which contribute to the satisfactory operation of the machine.

Having described the invention, what we claim is:

1. In combination with a transparent measuring tank having a series of level-indicating marks successively arranged upwardly beyond an initial level which is materially above the bottom of the tank; a delivery conduit extending within the measuring tank up to such initial level, and an adjustable supply and return pipe extending upwardly within said tank.

2. In combination with a transparent measuring tank having a series of level-indicating marks successively arranged upwardly beyond an initial level which is materially above the bottom of the tank; a delivery conduit extending within the measuring tank up to such initial level, a vertically adjustable supply and return pipe extending upwardly within the tank and adapted to be located with its upper terminal coincident with either of said level-indicating marks, and means for causing a flow of liquid through said pipe.

3. In combination with a transparent measuring tank having a series of level-indicating marks successively arranged upwardly beyond an initial level which is materially above the bottom of the tank; a delivery conduit extending within the measuring tank up to such initial level, a vertically adjustable supply and return pipe extending upwardly within said tank and adapted to be located with its upper terminal coincident with either of said level-indicating marks, and a splash coping on the upper end of said pipe adapted to direct fluid flowing therethrough in a downwardly direction.

In testimony whereof we hereunto affix our signatures.

ROBERT T. C. BAIN.
GEORGE W. MacKENZIE, Jr.

It is hereby certified that the name of the first-mentioned patentee in Letters Patent No. 1,255,576, granted February 5, 1918, for an improvement in "Liquid-Measuring Apparatus," was erroneously written and printed "Robert T. C. Bain", whereas said name should have been written and printed *Robert F. C. Bain;* and that the said Letters Patent should be read with this correction therein that the same may conform to the record of the case in the Patent Office.

Signed and sealed this 23d day of April, A. D., 1918.

[SEAL.]

F. W. H. CLAY,

*Acting Commissioner of Patents.*

Cl. 221—100.